(12) United States Patent
Soucy

(10) Patent No.: US 10,576,017 B2
(45) Date of Patent: Mar. 3, 2020

(54) AUTOMATIC TRASH CAN DELIVERY DEVICE

(71) Applicant: Norman Soucy, Spring Hill, FL (US)

(72) Inventor: Norman Soucy, Spring Hill, FL (US)

(*) Notice: Subject to any disclaimer, the term of this patent is extended or adjusted under 35 U.S.C. 154(b) by 0 days.

(21) Appl. No.: 16/153,989

(22) Filed: Oct. 8, 2018

(65) Prior Publication Data

US 2019/0112127 A1 Apr. 18, 2019

Related U.S. Application Data

(60) Provisional application No. 62/572,739, filed on Oct. 16, 2017.

(51) Int. Cl.

| | | |
|---|---|---|
| B65F 1/14 | (2006.01) |
| A61J 1/00 | (2006.01) |
| B60N 2/02 | (2006.01) |
| B60N 2/24 | (2006.01) |
| B60P 3/00 | (2006.01) |
| E05G 1/00 | (2006.01) |
| E05G 1/04 | (2006.01) |
| E06B 9/266 | (2006.01) |
| E06B 9/32 | (2006.01) |
| E06B 9/386 | (2006.01) |
| F16B 47/00 | (2006.01) |
| G05D 1/02 | (2020.01) |

(52) U.S. Cl.
CPC ............... *A61J 1/00* (2013.01); *B60N 2/02* (2013.01); *B60N 2/245* (2013.01); *B60P 3/00* (2013.01); *B65F 1/1426* (2013.01); *B65F 1/1473* (2013.01); *E05G 1/005* (2013.01); *E05G 1/04* (2013.01); *E06B 9/266* (2013.01); *E06B 9/32* (2013.01); *E06B 9/386* (2013.01); *F16B 47/00* (2013.01); *G05D 1/021* (2013.01); *G05D 1/0278* (2013.01); *B65F 2210/165* (2013.01); *B65F 2210/168* (2013.01)

(58) Field of Classification Search
CPC ...................................................... B65F 1/1473
See application file for complete search history.

(56) References Cited

U.S. PATENT DOCUMENTS

| | | | | |
|---|---|---|---|---|
| 5,096,049 A | * | 3/1992 | Anderson | B65G 19/02 |
| | | | | 104/172.3 |
| 5,189,612 A | * | 2/1993 | Lemercier | G05D 1/0238 |
| | | | | 180/168 |
| 5,245,335 A | * | 9/1993 | Hill | G05D 1/0265 |
| | | | | 180/168 |
| 5,353,887 A | * | 10/1994 | Putnam | A61G 5/043 |
| | | | | 104/246 |

(Continued)

*Primary Examiner* — Brian L Swenson
(74) *Attorney, Agent, or Firm* — The Iwashko Law Firm, PLLC; Lev Ivan Gabriel Iwashko

(57) ABSTRACT

An automatic trash can delivery device to transport a trash can, the automatic trash can delivery device including a main body including a trash can holding portion to hold the trash can therein, a processor disposed within the main body to receive a signal to control the automatic trash can delivery device to move, a motor to be activated in response to the signal received by the processor, and a plurality of wheels disposed at a bottom portion of the main body to rotate and pivot in response to the activation of the motor, such that the automatic trash can delivery device moves along a predetermined path.

4 Claims, 2 Drawing Sheets

(56) References Cited

U.S. PATENT DOCUMENTS

| | | | | |
|---|---|---|---|---|
| 5,901,805 | A * | 5/1999 | Murakami | B62D 1/28 |
| | | | | 180/168 |
| 8,146,695 | B1 * | 4/2012 | Ramshur | B62D 1/283 |
| | | | | 180/168 |
| 9,908,695 | B1 * | 3/2018 | Thompson | B65F 1/1468 |
| 2007/0179690 | A1 * | 8/2007 | Stewart | G01C 21/00 |
| | | | | 701/23 |
| 2007/0209846 | A1 * | 9/2007 | Wilson | B65F 1/1468 |
| | | | | 180/65.1 |
| 2008/0038102 | A1 * | 2/2008 | Murphy | B65F 1/1468 |
| | | | | 414/403 |
| 2008/0140253 | A1 * | 6/2008 | Brown | B65F 1/1638 |
| | | | | 700/245 |
| 2015/0307273 | A1 * | 10/2015 | Lyman | G01G 19/08 |
| | | | | 705/7.13 |
| 2017/0174427 | A1 * | 6/2017 | Wagner | B65F 1/1452 |
| 2018/0079591 | A1 * | 3/2018 | Doty | B65F 3/00 |

* cited by examiner

AUTOMATIC TRASH CAN DELIVERY DEVICE

BACKGROUND

1. Field

The present general inventive concept relates generally to an apparatus to facilitate bagging.

2. Description of the Related Art

Trash cans have come a long way in both style and function to accommodate busy and modern lifestyles. However, the chore of taking out the garbage is unpleasant, and there are limited products available on the market that makes this process easier and more efficient. Also, when people are on vacation, their trash cans may be left on the curb for an extended period of time Therefore, there is a need for a device that allows a user to control trash can movement to and from a curb.

SUMMARY

The present general inventive concept provides an automatic trash can delivery device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an automatic trash can delivery device to transport a trash can, the automatic trash can delivery device including a main body including a trash can holding portion to hold the trash can therein, a processor disposed within the main body to receive a signal to control the automatic trash can delivery device to move, a motor to be activated in response to the signal received by the processor, and a plurality of wheels disposed at a bottom portion of the main body to rotate and pivot in response to the activation of the motor, such that the automatic trash can delivery device moves along a predetermined path.

The automatic trash can delivery device may further include a sensor disposed on the main body to communicate with a plurality of sensor guides disposed on a ground along the predetermined path, such that the sensor causes the automatic trash can delivery device to remain between the plurality of sensor guides as the automatic trash can delivery device moves along a predetermined path.

The processor may include a GPS unit to move the automatic trash can delivery device along the predetermined path based on input received on at least one of a mobile device and an input unit disposed on a surface of the main body.

The processor may receive the signal from at least one of a mobile device and an input unit disposed on a surface of the main body.

The processor may control the automatic trash can delivery device to move based on a predetermined schedule input into the at least one of the mobile device and the input unit.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
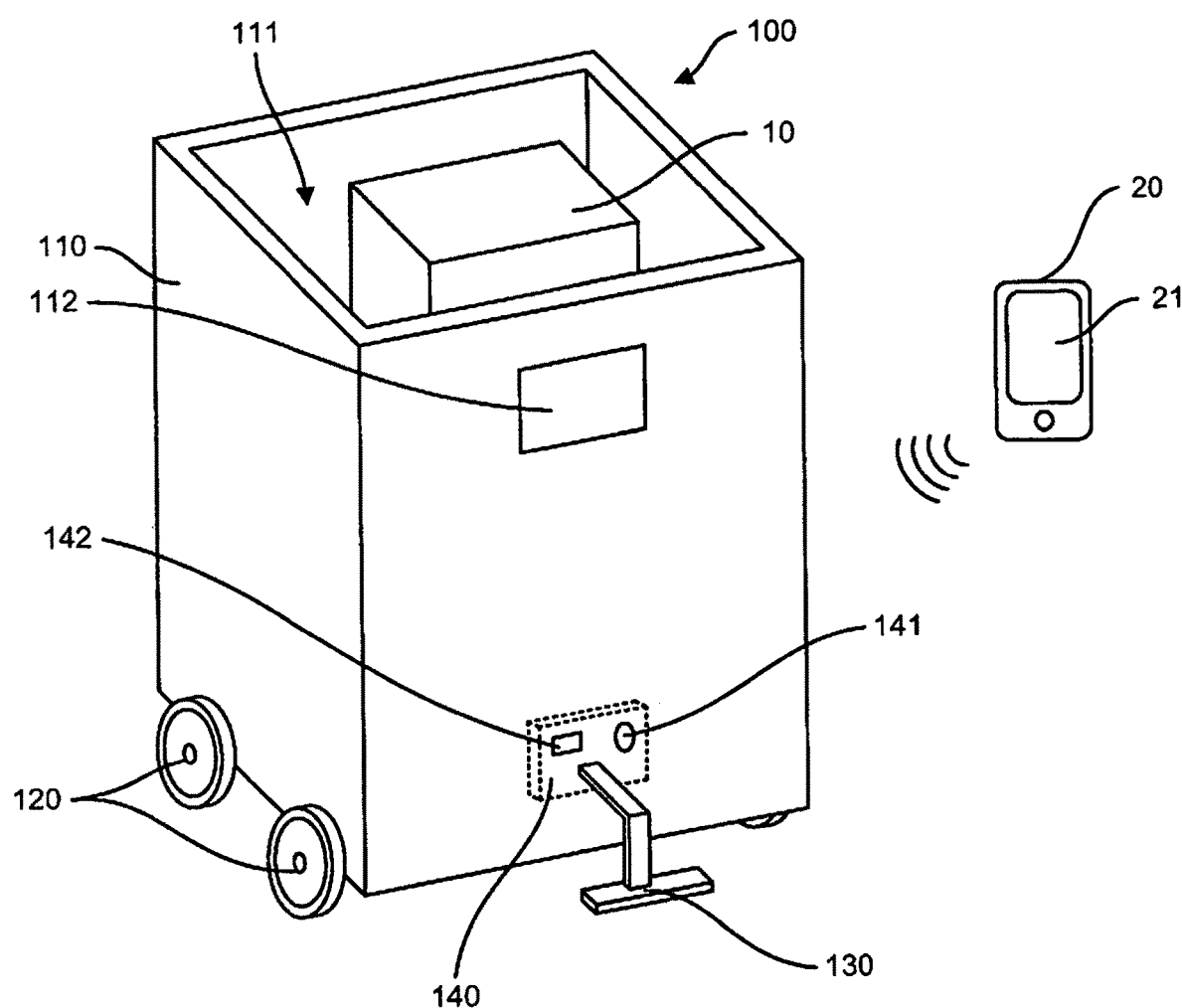
FIG. 1 illustrates a top angled view of an automatic trash can delivery device, according to an exemplary embodiment of the present general inventive concept.

FIG. 1 illustrates a top angled view of an automatic trash can delivery device 100, according to an exemplary embodiment of the present general inventive concept.

Figure 2:
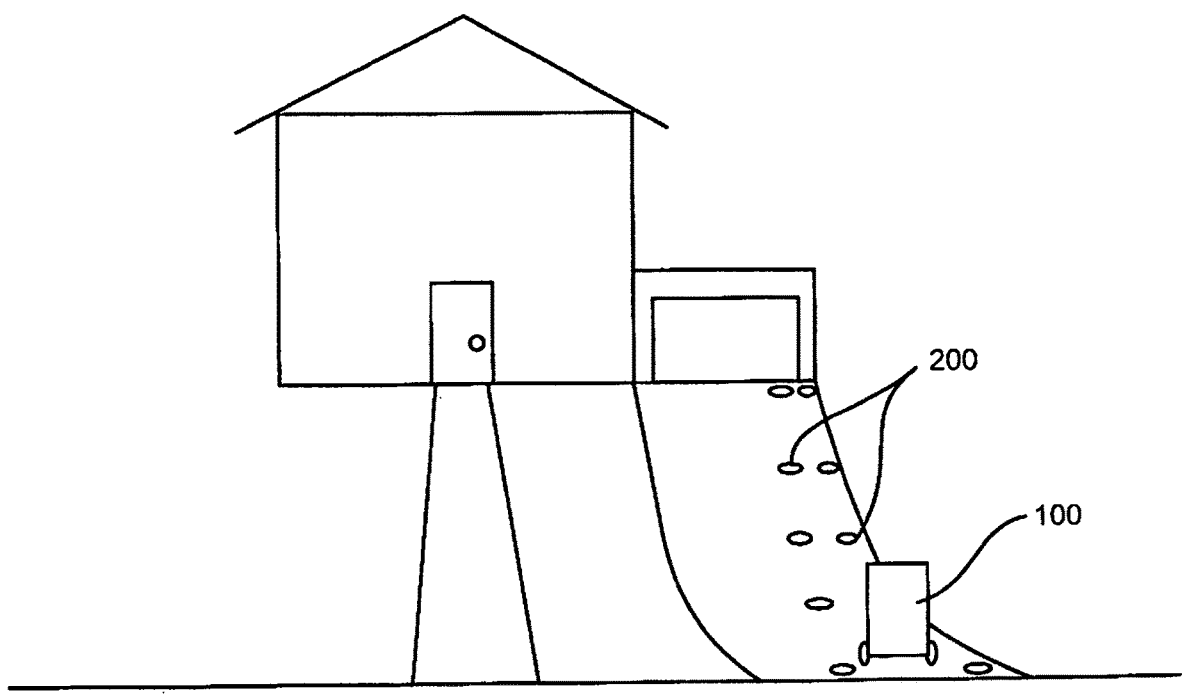
FIG. 2 illustrates a front perspective view of the automatic trash can delivery device moving down a path between sensor guides, according to an exemplary embodiment of the present general inventive concept.

FIG. 2 illustrates a front perspective view of the automatic trash can delivery device moving down a path between sensor guides 200, according to an exemplary embodiment of the present general inventive concept.

The automatic trash can delivery device 100 may include a main body 110, a plurality of wheels 120, a sensor 130, a processor 140, and a motor 150, but is not limited thereto.

Although FIG. 1 illustrates the main body 110 as a rectangular prism, the main body 110 may have any size and shape known to one of ordinary skill in the art.

The main body 110 may include a large holding aperture, known as a trash can holding portion 111, which may hold a trash can 10 thereinside for transport of the trash can 10.

The plurality of wheels 120 may be disposed at a bottom portion of the main body 110, and may allow the automatic trash can delivery device 100 to roll in any direction. In other words, the plurality of wheels 120 may rotate and pivot, based on a user's preference and/or commands. Specifically, the plurality of wheels 120 may rotate and pivot when the motor 150 is activated.

Referring to FIGS. 1 and 2, the sensor 130 may be disposed on the main body 110, and may communicate with a plurality of sensor guides 200, which may be placed along a path (e.g., a ground, a floor, etc.) in a particular direction and/or configuration.

The processor 140 may be disposed on or within the main body 110, and may be a CPU, a microprocessor, a controller, or any other type of computing device that may process programs and/or instructions, and which may control the other electrical components within the automatic trash can delivery device 100.

The processor 140 may be connected to the sensor 130 and the motor 150, such that the processor 140 causes the motor 150 to be activated (i.e., turned on) when the processor 140, which includes a transmitter/receiver 141, receives a signal from a mobile device 20, for example.

The motor 150 may be any type of motor and/or control device to control the plurality of wheels 120 to rotate and pivot.

The mobile device 20 may be a cellular telephone, a remote control, or any other device that may have wireless communication capabilities, and may be connected to the Internet. The mobile device 20 may perform any type of wireless communication, including, but not limited to, WIFI, BLUETOOTH, RFID, etc.

As such, the user may use the mobile device 20 to input and/or program a date and time that the automatic trash can delivery device 100 is scheduled to move down a path designated by the plurality of sensor guides 200, and a signal may be sent from the mobile device 20 to the transmitter/receiver 141 such that the processor 130 (which may include a storage device) stores the date and time that the automatic trash can delivery device 100 is scheduled to move. Alternatively, the mobile device 20 may send a signal to the transmitter/receiver 141 to control the automatic trash can delivery device 100 to move immediately.

When the transmitter/receiver 141 receives the signal from the mobile device 20 to control the automatic trash can delivery device 100 to move, the processor 140 may activate the motor 150, such that the plurality of wheels 120 begin rotating. The sensor 130 causes the automatic trash can delivery device 100 to stay along a path designated by the plurality of sensor guides 200, such that the automatic trash can delivery device 100 may stay between the plurality of sensor guides 200. As such, the motor 150 may cause the plurality of wheels 120 to rotate and pivot, thereby causing the automatic trash can delivery device 100 to move along the path designated by the plurality of sensor guides 200 (i.e., between the plurality of sensor guides 200), until the automatic trash can delivery device 100 reaches an and of the path designated by the plurality of sensor guides 200.

Likewise, the automatic trash can delivery device 100 may be programmed and/or controlled to return back to a beginning of the path designated by the plurality of sensor guides 200. In other words, the automatic trash can delivery device 100 may move back and forth along the path designated by the plurality of sensor guides 200.

Alternatively, the processor 140 may include a GPS unit 142 that may be programmed and/or controlled by the mobile device 20 to move to a predetermined location based on an input of the user. In other words, the GPS unit 142 may a global positioning device that communicates with satellites in order to determine a location of the automatic trash can delivery device 100. As such, the sensor 130 and the plurality of sensor guides 200 may not be required when the GPS unit 142 is included in the processor 140. Also, a display screen 21 (which may also be an input unit/touch screen) on the mobile device 20 may display the automatic trash can delivery device 100 on a map as it is moving.

Furthermore, the automatic trash can delivery device 100 may have an input unit 112 including buttons or a touch screen (preferably waterproof) disposed thereupon to program the processor 140 directly, instead of requiring the processor 140 to communicate with the mobile device 20.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An automatic trash can delivery device to transport a trash can, the automatic trash can delivery device comprising:
   a main body including a trash can holding portion to hold the trash can therein;
   a processor disposed within the main body to receive a signal to control the automatic trash can delivery device to move;
   a motor to be activated in response to the signal received by the processor;
   a plurality of wheels disposed at a bottom portion of the main body to rotate and pivot in response to the activation of the motor, such that the automatic trash can delivery device moves along a predetermined path; and
   a sensor disposed on the main body to communicate with a plurality of sensor guides disposed on a ground along the predetermined path, such that the sensor causes the automatic trash can delivery device to remain between the plurality of sensor guides as the automatic trash can delivery device moves along a predetermined path, such that the sensor is disposed a distance away from the main body, such that at least a first portion of the sensor is parallel to the predetermined path, and at least a second portion of the sensor is perpendicular to the predetermined path.

2. The automatic trash can delivery device of claim 1, wherein the processor comprises:
   a GPS unit to move the automatic trash can delivery device along the predetermined path based on input received on at least one of a mobile device and an input unit disposed on a surface of the main body.

3. The automatic trash can delivery device of claim 1, wherein the processor receives the signal from at least one of a mobile device and an input unit disposed on a surface of the main body.

4. The automatic trash can delivery device of claim 3, wherein the processor controls the automatic trash can delivery device to move based on a predetermined schedule input into the at least one of the mobile device and the input unit.

* * * * *